(No Model.) 4 Sheets—Sheet 1.
R. KIESERLING & M. MÖLLER.
PROCESS OF MAKING HOLLOW OBJECTS FROM PLASTIC MATERIAL.
No. 502,196. Patented July 25, 1893.
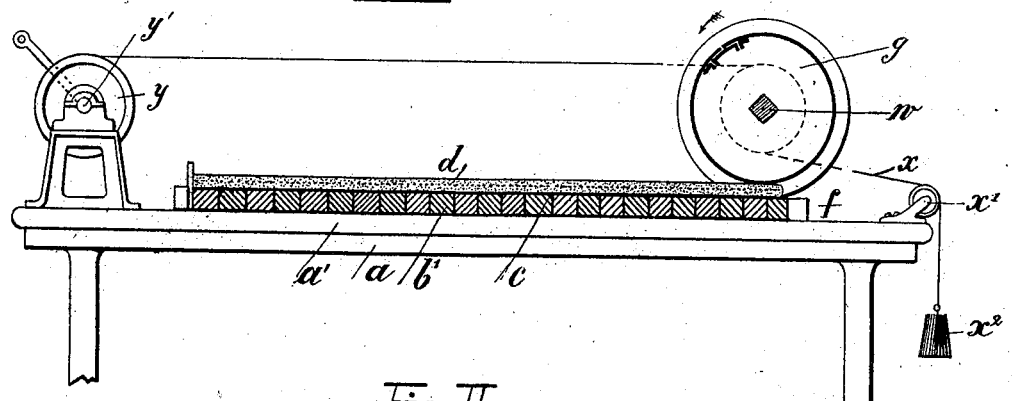
Fig. I
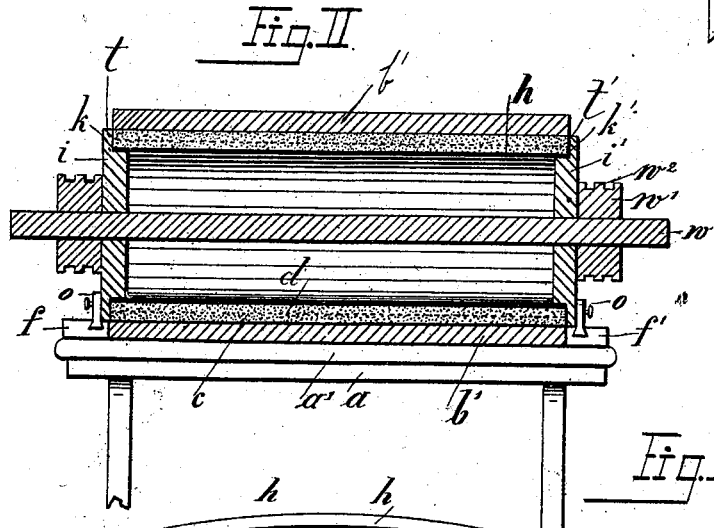
Fig. II
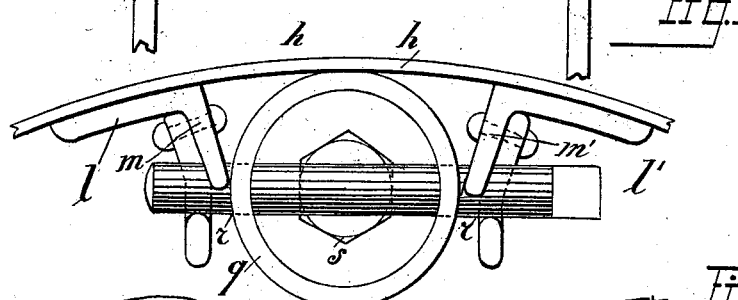
Fig. III
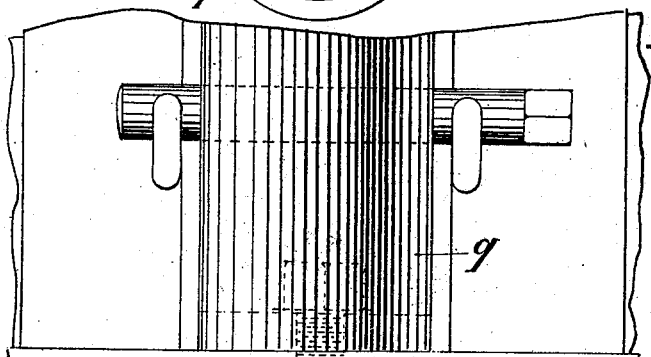
Fig. IV
Witnesses:
J. A. Rutherford
Robert Emett
Inventors:
Robert Kieserling and Max Möller
By James L. Norris, Atty.

(No Model.) 4 Sheets—Sheet 2.
R. KIESERLING & M. MÖLLER.
PROCESS OF MAKING HOLLOW OBJECTS FROM PLASTIC MATERIAL.
No. 502,196. Patented July 25, 1893.
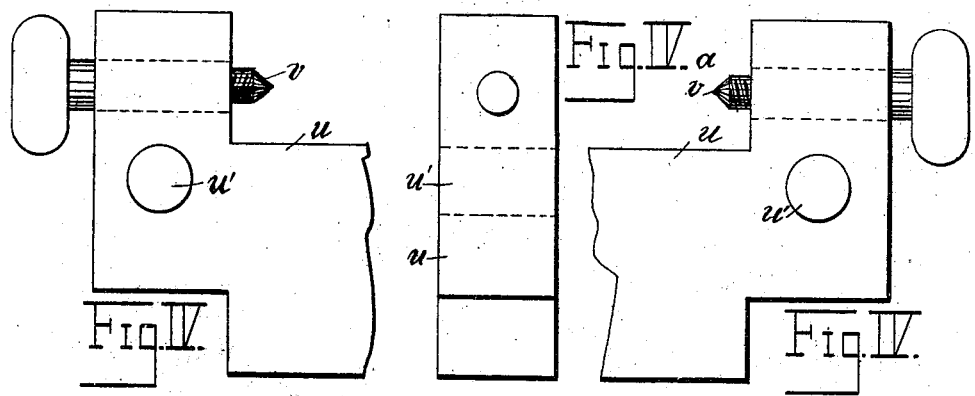
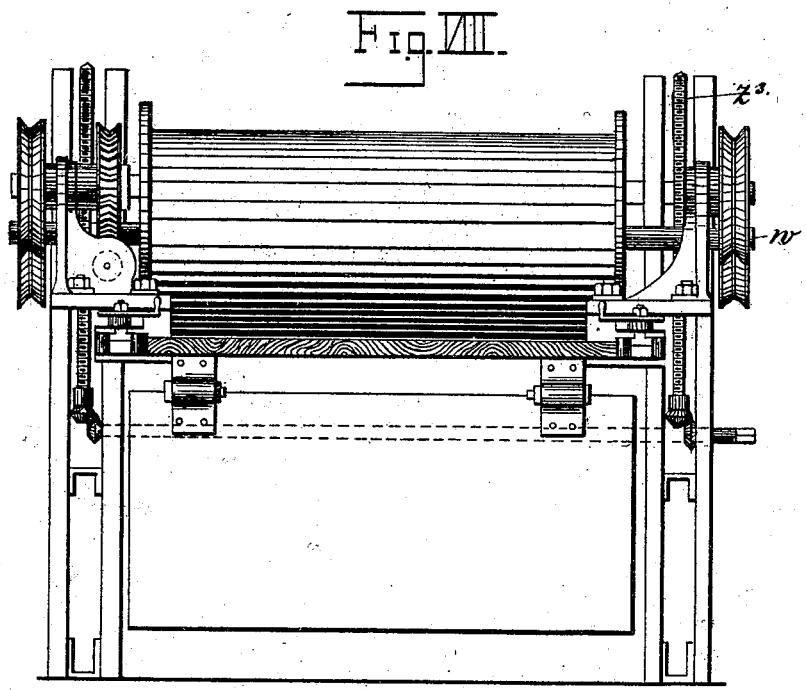
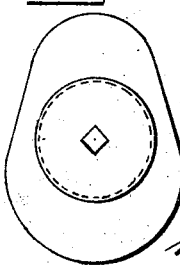

(No Model.) 4 Sheets—Sheet 3.
R. KIESERLING & M. MÖLLER.
PROCESS OF MAKING HOLLOW OBJECTS FROM PLASTIC MATERIAL.
No. 502,196. Patented July 25, 1893.
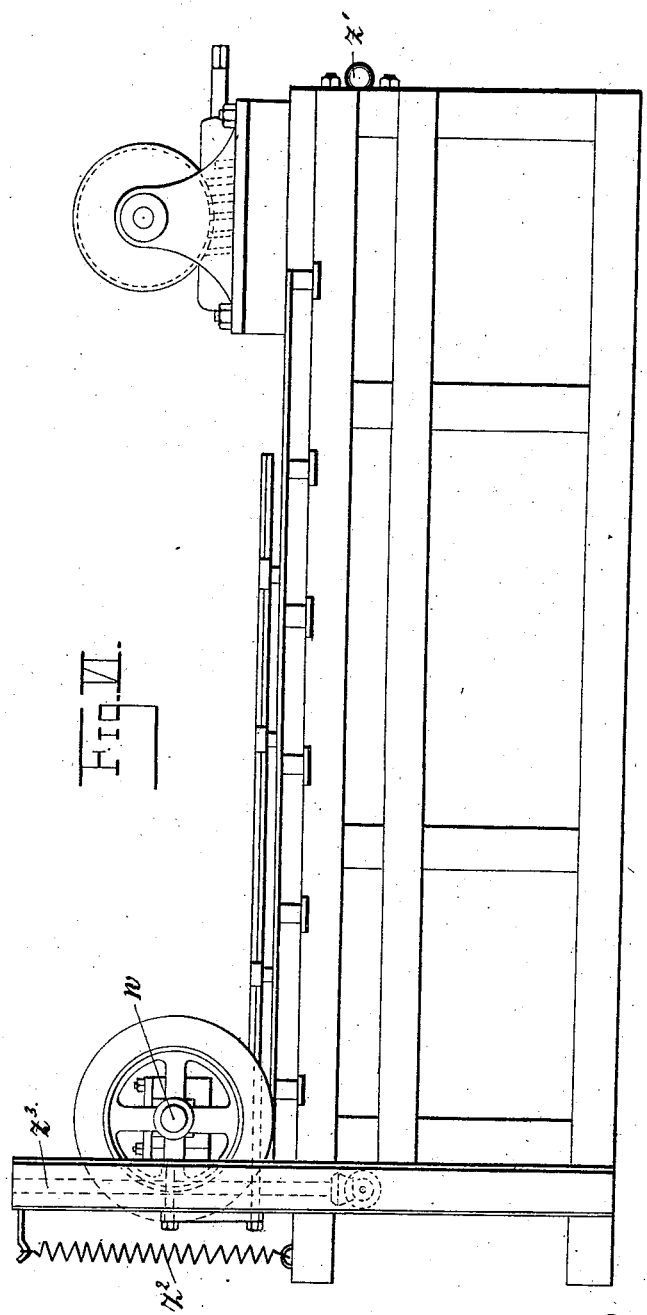

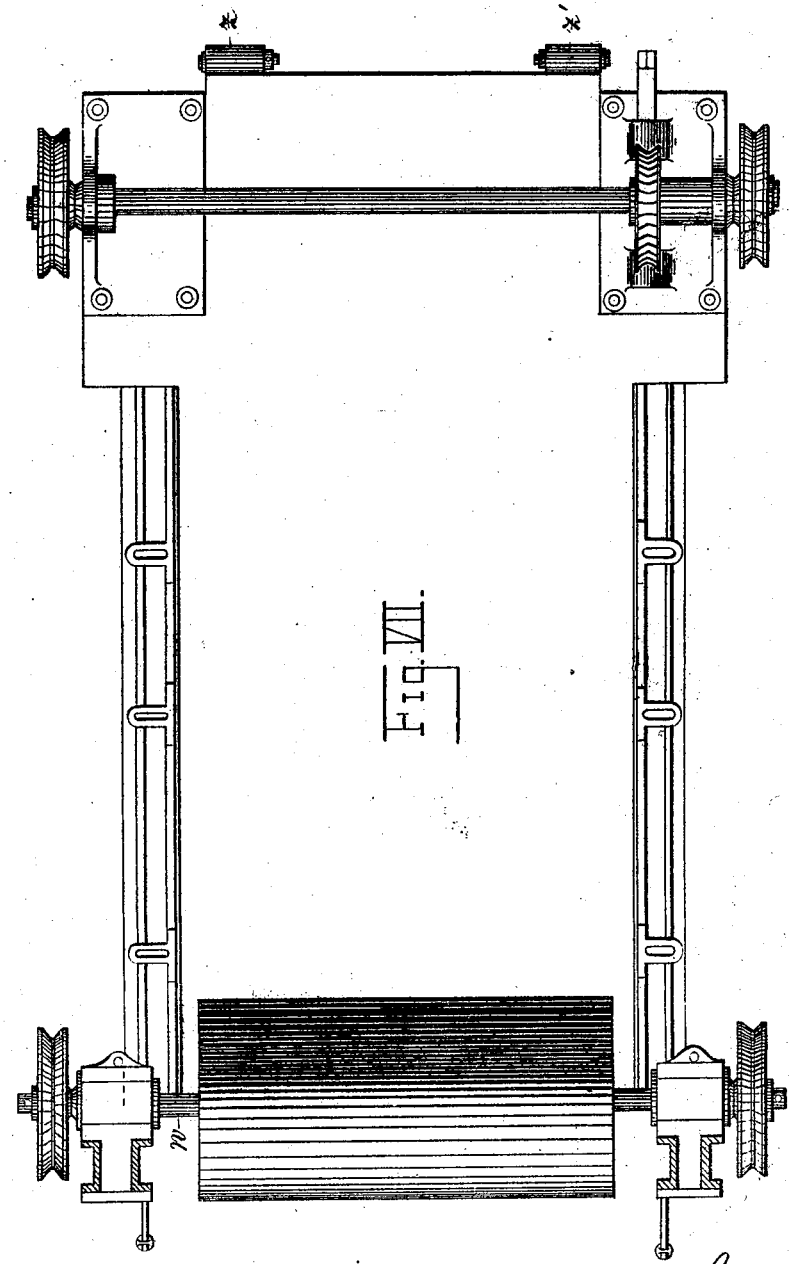

UNITED STATES PATENT OFFICE.

ROBERT KIESERLING AND MAX MÖLLER, OF ALTONA, GERMANY.

PROCESS OF MAKING HOLLOW OBJECTS FROM PLASTIC MATERIAL.

SPECIFICATION forming part of Letters Patent No. 502,196, dated July 25, 1893.

Application filed June 4, 1892. Serial No. 435,546. (No specimens.)

*To all whom it may concern:*

Be it known that we, ROBERT KIESERLING and MAX MÖLLER, subjects of the King of Prussia, and residents of Altona, Kingdom of Prussia and German Empire, have invented certain new and useful improvements in processes of making hollow objects out of plastic bodies which are hardened either by air or fire, of which the following is a specification.

This invention relates to improvements in the manufacture of plastic or similar articles, hardened by exposure to the air or by being burned in kilns, &c.

The invention consists in a new process for the formation or molding of hollow ware made of plastic material to be hardened by exposure to the air or to fire, and in such manner, that by great pressure, or thorough beating or kneading the material is formed into a very regular and homogeneous sheet, plate or platen, whereupon this plate, which lies or rests upon a plate, that can be folded and bent around a sectional core, around which it can be wrapped and the opposite ends properly united and made tight, after which the hollow article so formed can, after a proper time, be taken from the core and its outer covering removed, either to be hardened by exposure to the air or to fire.

It is a well-known fact, that in the formation of hollow articles made of plastic material, a uniform density is not easily obtained. The cause of this is, that in forming them, in most instances, it is impossible so to manipulate the plastic material that the conditions for obtaining a perfectly uniform inner density can be obtained. Our observations have convinced us, that plastic masses, such as cement, cement-béton, clay, and clay containing mixtures, kaolin, porcelain earth, gypsum, asphalt, &c., and articles formed of such materials can only acquire a uniform density, when the plastic masses or material are thoroughly kneaded, beaten, rolled or are similarly treated, before molding, so that they do not possess small air bubbles, but instead the different parts thereof are closely united and will stick closely together. It will be apparent, that materials treated in this manner beforehand, and especially, when it is done by thorough manipulation, will acquire a body of very uniform or homogeneous density in its interior. Upon this our new procedure rests, which we will now describe more specifically.

We have already remarked, that in carrying out our invention, besides the already named materials, different kinds of plastic materials can be employed. In view of this we will assume, as the process does not depend upon the material, that it is desired to produce hollow articles out of cement or béton-cement, because these materials are especially well adapted to illustrate our new process, and to illustrate it to the best advantage.

In our process the cement-mixture, consisting of cement, sand and gravel, is first thoroughly mixed in a dry state, and the mixture, while constantly manipulated by shoveling, is slightly moistened, so that a uniformly moist mass is produced. This mass is spread upon an oiled piece of canvas, and placed upon a flexible plate. This plate consists of a number of staves or slats, placed as close as possible together, and united by flexible bands. This plate we will hereinafter designate as the slat-plate, to distinguish it from the layer of cement produced, which latter we will designate as the platen. The oiled canvas spread over the slat-plate prevents the cement from entering into the interstices between the slats. This is however not possible, when said plate is flattened out in a horizontal position, as the slats then lie close together; it would however be possible, when said plate is curved, when the slats do not lie close together and are open at their edges. It will therefore be observed, that if it is desirable to dispense with the canvas layer, it can in some cases be dispensed with. This can be done, if in place of the flexible plate, (although not desirable) any other flexible plate or a stiffened cloth is employed. Upon the slat-plate or rather upon the oiled canvas covering the same, the cement-mixture is spread out in a very uniform manner, forming a layer or platen. This can be done by hand or by machine by pressing, stamping, beating, or rolling, always however being particular to do this in an even and regular manner to make the center dense. Next a core is produced, having an outer covering, corresponding to the inner shape of the hollow-ware to be produced. This core has of course to be of different forms, according to the form of the hollow articles to be produced; as the same never remains in that form, care must be taken, that it is constructed in such manner that it can be easily withdrawn from the hollow article. After this core, which we will more definitely describe hereinafter in carrying out our process, has been produced, we wrap the slatted-plate around it, so that the layer of cement lies between the core and the slatted plate. The rolling up of the same can be done by attaching the core to one end of the slatted plate, and then rolling it over the layer of cement, whereby the slatted plate and the cement-plate or layer will wrap themselves on the core. Or we can connect the core with the slatted-plate, and slowly revolve it on a fixed axis, when the same is wound gradually upon it; or we may arrange the core about the middle of the slatted plate, in such manner that it touches the cement-layer at right angles to the length of the same, and then fold the slat-plate from both sides around the core, whereby the cement-layer will lie upon the same. After the slat-plate and with the same, the cement-layer is wrapped on the core according to either of the methods described, the two opposite ends of the slat-plate are drawn tightly together, so that the same incloses the cement layer tightly, and then unite or join its two ends firmly by stamping, kneading, or rubbing in of cement into the abutting edges. The real molding-process is now completed. The mold, viz. the core with the cement-layer, the oiled canvas and the slatted plate can then be set to one side, to be taken apart, when the cement is sufficiently hardened to remove the core, as well as the slat-plate, without danger of injury to the cement-hollow-ware. The slat-plate and the sail cloth can then be taken off. The core is usually removed a little later, by removing a key-piece, by which the core will fall together, or it can be shoved together, so that it can be easily removed from the hollow article. When the core is removed, the hollow cement-article will stand finished.

It will be easily understood and has already been referred to, that if desired, in some instances, instead of the slat-plate, any other elastic or flexible plate of metal, wood or other suitable material can be employed; we have found however, that the employment of the slat-plate described is the surest way to produce hollow-ware made according to our process, of the very best quality.

When it is desired to produce hollow articles of great strength and durability, we proceed as follows: After we have, for instance placed about half the quantity of the cement-mixture on the oiled canvas, laying on the slat-plate we spread it out. On this layer we then place a thin perforated metal plate or wire-cloth or wire-netting or lining of about the same size as the slat-plate. Upon this iron plate, wire screen, or lining we place the second half of the cement, which we then thoroughly manipulate, i. e. press, beat, knead, stamp or roll, and thus form a strong layer of even thickness. In this manner the iron-plate or equivalent is inclosed in between two layers of the cement-mixture. It is however not necessary, that both layers should be of the same thickness, for one can be much thicker than the other. We often make the lower layer very thin, so that the lining is hardly covered by the cement mixture, and sometimes very thick, according to the requirements for which the hollow article is intended. The cement-plate formed in this manner with the metal-lining, we then wrap or roll around a core according to one of the above-described processes, and then we unite the ends of the flexible or slatted plate, then the opposite ends of the metal lining by means of wires or rope, or in any other manner, and draw them together, and then stamp or press the abutting ends of the cement-layer together, and then let the entire article stand until the cement has become sufficiently hardened, to allow the removal of the slatted-plate, the canvas and the core. The article produced in this manner incloses the metal-lining entirely, so that it cannot be seen at all. The strength of the hollow article is in this manner greatly increased by the metal lining; moreover this inclosed metal lining permits the removal of the slat-plate much sooner, than when said metal lining is not employed, as it will prevent small pieces of cement breaking off when the slat-plate is released.

By another modification of our process, hollow articles can be produced with a much smoother or polished interior surface. Such hollow articles as for instance, pipes, will become a much sought for article of commerce, as they can, when used for the conveyance of fluids or gases under pressure will offer a small resistance or friction to them. Another advantage is, that these pipes are less penetrable by said fluids, than when they have the inner surface not smoothened or polished.

To produce hollow articles with inner smooth or polished surfaces, the upper surface of the cement layer lying upon the sail cloth is manipulated with especial care, and it is strongly pressed, smoothed in the best manner and after being made even with a draw-iron, it is polished, so that it will be perfectly even, tight and polished. If we roll a layer obtained in this manner upon a core having also a smooth and polished surface, we will receive a hollow-article having a perfectly smooth and tight inner surface, on removal of the core. The outer surface or contour of the hollow articles, produced by our methods, can be of any shape desired. It will also be seen, that hollow articles can be produced having different degrees of strength in different places. The devices employed for this purpose, we will describe farther on in the description of the machine used for carrying out our processes.

We have heretofore only spoken of a slat-plate with flat staves or slats, but it will be readily perceived that such a plate may consist of curved or irregular staves, so that in rolling them up on a correspondingly shaped core (not cylindrical) such articles can be produced. In this manner we can, for instance, produce pipes provided with flanges, by bending the slat-plate out to one side, according to the corresponding core. It has already been stated, that if it is desired to produce hollow articles of uniform thickness, the core must be made accordingly. We will refer later on in the description of the machine employed for the production of hollow articles according to our processes, to several suitable means, to increase or decrease the thicknesses of said hollow articles. The cement layer for producing hollow articles of uneven thicknesses should be made with uneven thicknesses at the desired places beforehand, as then, the rolling up is much easier than when the unevenness must be produced by more or less pressure during winding against the core, which is moreover troublesome and not to be recommended.

In the drawings we illustrate a suitable mechanism for carrying our process into effect, wherein—

Figure I is a longitudinal section of an arrangement for rolling up the slatted plate on the core. Fig. II is a vertical cross section of the core rolled up and a front view of the table supporting it. Figs. III and III$^a$ represent a part of the core with a locking-piece for holding it together. Fig. IV is a side view of a carrier or bar, which serves for uniting the slat-plate with the core, when it is to be rolled on the core; it is partly broken away and drawn on an enlarged scale. Fig. IV$^a$ is an end view of the same without the connecting screw. Fig. V is a side view of a core for the production of pipes of oval cross-section. Fig. VI shows a machine in elevation and modified from Fig. I, for carrying out our process. Fig. VII is a top view of the machine, shown in Fig. VI. Fig. VIII is an end view of the same.

Like letters indicate similar parts in the different figures, in which—

$a$ is a strong table, upon whose top $a'$ the slatted plate $b$ is spread out. This slatted plate consists of a large number of parallel, closely lying staves or slats $b'$, which are united at their upper sides by elastic bands, hinges or similar devices, so as to form a jointed, rollable slatted plate. This slat-plate $b$ is independent of the top $a'$, and in no wise connected to it; it carries the canvas $c$ which is shown in the drawings only as a straight line in Fig. I. Upon this cloth a suitable quantity of freshly prepared cement-bèton is spread to a certain thickness. Upon this layer $d$ the metal lining or wire gauze $e$ is first laid and then another quantity of cement-bèton placed on top, and the whole formed into a platen $d$ by pressing, stamping, rolling, &c. To the table top $a'$ adjustable side strips $f f'$ are attached, which form bounds for the slatted plate and must be of the same height as it is. These side strips $f f'$ serve to prevent any side movement of said slatted plate $b$, when it is being rolled up on the core, $g$, and which would be very objectionable if it occurred. Furthermore these side-strips $f f'$ serve as bearings or rails for the flanges of the core $g$ as described hereinafter.

The core $g$ must correspond in contour to the inner side of the hollow article to be produced, and as it never permanently remains in connection with it, must be removable, i. e. consists of several parts placed together in such manner, that they can be easily removed or taken to pieces from the finished hollow article. We produce the core preferably in the following manner: A piece of sheet metal $h$ (Fig. III) forming a covering is bent around until the ends meet. This sheet metal $h$ which has a tendency to spring apart, like a spring or to roll itself up, forms the outer part or covering of the core. This covering $h$ of the core $g$ is provided at its ends with the heads $i\ i'$, having the recessed flanges $k\ k'$. To these flanges the part $h$ is secured on the recessed part. Previously the ends of the covering $h$ must be united as hereinafter described. Near each end of the part $h$ two angle irons $l$ are riveted, running at right angles to the axis of the sheet metal part $h$ which is bent in cylindrical shape. These angle irons have two or more hooks $m\ m'$, arranged in pairs secured to them, so that the connecting lines of each two hooks are opposite each other and at right angles to the adjoining edges of the covering $h$. The connection of each two hooks $m\ m'$ is made by means of bolts $p$, passing at right angles through a piece of tube $q$. The bolts $p$ are provided with depressions $r$ and $r'$, with which the angle irons $l\ l'$, engage in such manner, that the metal covering $h$ is completely closed and cannot spring apart. The locking of the covering is done in the following manner, the piece of tube $q$ is placed in the open covering and entered by the bolts $p$ into the hooks so that they lie in the depressions. If the lock is to be opened, the tube $q$ is raised so that the bolts $p$ come out of contact with the hooks $m, m'$.

At each end the tube can be closed by a tight stopper or head $s$, screwed in or otherwise secured therein, through which a headed screw bolt $s'$ is carried, passing through the heads $i$ and $i'$ on the covering $h$ and serving as a nut, although it may also serve to attach the slatted plate to the core. Two objects can be attained by means of this bolt $s'$, by making it long enough, so that not only is there room enough for the nut securing the heads against the covering, but a projecting end can be connected with a carrier on the slatted plate.

The flanges $t.\ t'$. of the heads $i.\ i'$. project beyond the covering of the core $g$ after the heads have been secured. The shape of these flanges is regulated according to the thickness of the hollow article to be produced, as well as the outer configuration. The thickness of the hollow articles will be governed by the depth of the flanges. As already stated, it is however not necessary, that the hollow article shall be of uniform thickness. In other words: the outer edge of the flanges $t.\ t'$. can be very much varied. If the core $g$ has been inclosed with the cement layer $d$ and the slatted plate, by which the head pieces $i\ i'$. bear against the side pieces $f.\ f'$. that are secured from sidewise movement by the adjustable clamps $o,\ o$. and arranged to slide in said side pieces $f.\ f'$., then the cement layer $d$, corresponds in width to the space between the flanges $t\ t'$ or the width of the covering $h$, while the slatted plate bounds the cement layer on the outside. After the ends of the slatted plate have been drawn together, the ends of the wire netting or equivalent, are secured and the adjacent or abutting edges of the cement layer are made tight by stamping or otherwise. To facilitate the drawing together of the slatted plate, bars or carriers $u$ are attached, which serve not only to wrap or roll this plate on the core, but also to draw it together, so that screw bolts (set screws) $v$ in pairs can be inserted in the holes $u'$ and that the bars can be drawn close together under pressure by the bolts. For wrapping up the slatted plate on the core, we connect the bars $u$ attached to the opposite ends of said plate with the core by said screw bolts $v$ by inserting them in holes $u'$ provided in the heads. If the core is then revolved on an axis or shaft arranged in stationary bearings, it will be seen, that the slatted plate will be wound up on it. The bars $u$ may be made of angle iron bent at an angle, but they can be made in one piece with the bars $b'$, if desired. We will now proceed to describe the means we employ to wrap or roll the slatted plate and the cement layer on the core in a regular and suitable manner. In Figs. I and II the core is represented as secured to a shaft $w$, which is provided with the sheaves $w'$, having the grooves $w^2$. In these grooves are placed the ropes $x$, the ends of which pass over the rollers $x'$ and have the weights $x^2$ attached to them, while the opposite ends pass around drums $y$, secured to a shaft $y'$, and can be wound up on them by any suitable means. After the set screws $v$ have been screwed into the proper holes $u'$ in the heads $i$ and $i'$, the drums $y$ are revolved and the ropes $x$ wound on them, by which the slatted plate and cement layers are wound up. Before securing the ends of the metal lining $e$, as well as uniting the ends of the cement-layer, the ends of the slatted plate must be drawn together, the ropes $x$ in the grooves $w^2$ of the sheaves $w'$ and the core with its inclosure set to one side. After the cement has been properly hardened, the slatted plate and the core with the heads $i\ i'$ are loosened, and the hollow article is finished, either to be finally hardened in the air or to be properly burned.

In the machine represented in Figs. VI to VIII the shaft $w$ of the core $g$ revolves in fixed journals $z$, so that in turning the core, after the bars $u$ have been united to it, the cement-layer and the slatted plate are drawn toward it and wound around the same. This arrangement is especially noticeable by the movable, table top $a'$ provided with hinges $z'$ which is forced toward the core by strong springs $z^2$. In this manner the cement-layer is pressed against the core in a proper manner, that is against the flanges, $t\ t'$, as these regulate any further upward movement of the table top. The springs $z^2$ are secured at their opposite ends to a hook on the upper end of the frame $x^3$. In place of the movable table-top with hinges $z'$, one might be employed that would balance itself. If the opposite end from the core were pivoted and weighted, then the other end would press against the core with certain pressure. By changing the weight pressing on one side, we are enabled to regulate the pressure required against the cement-layer placed between the core and the table top, and by this means said cement-layer is pressed against the covering of the core. The winding or rolling up of the slatted plate on the core is also accomplished in the machine represented in Figs. VI to VIII by means of the drums $y$ keyed to the general shaft. This last described arrangement can be simplified, by changing the sheaves $w'$ to wormwheels, with which a proper worm engages. By this arrangement we obtain the advantage of dispensing with the objectionable ropes.

Having now described the nature and operation of our invention, what we claim is—

The process of molding hollow cylindrical objects from plastic material which consists in evenly spreading a layer of plastic material upon a flexible molding plate, attaching a collapsible core to one end of said flexible molding plate, and then wrapping or rolling the flexible molding plate around said core and interposed layer of plastic material, and finally removing the molding plate and core after the plastic material has become hardened in cylindrical form substantially as described.

In witness whereof we have hereunto set our hands in presence of two witnesses.

ROBERT KIESERLING.
MAX MÖLLER.

Witnesses:
P. CASATI,
H. NODOP.